(12) United States Patent
Liu et al.

(10) Patent No.: US 10,891,343 B2
(45) Date of Patent: *Jan. 12, 2021

(54) RECOMMENDING CONTACTS IN A SOCIAL NETWORK

(71) Applicant: Microsoft Technology Licensing, LLC, Redmond, WA (US)

(72) Inventors: Dafan Liu, Beijing (CN); Hua Chen, Beijing (CN); Wei-Ying Ma, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 377 days.

This patent is subject to a terminal disclaimer.

(21) Appl. No.: 15/452,442

(22) Filed: Mar. 7, 2017

(65) Prior Publication Data

US 2017/0177732 A1 Jun. 22, 2017

Related U.S. Application Data

(63) Continuation of application No. 12/546,630, filed on Aug. 24, 2009, now Pat. No. 9,626,648, which is a continuation of application No. 11/468,863, filed on Aug. 31, 2006, now Pat. No. 7,596,597.

(51) Int. Cl.
*G06F 16/9535* (2019.01)
*G06F 16/2457* (2019.01)
*H04L 29/08* (2006.01)
*G06Q 50/00* (2012.01)
*G06Q 10/10* (2012.01)

(52) U.S. Cl.
CPC .... *G06F 16/9535* (2019.01); *G06F 16/24575* (2019.01); *G06F 16/24578* (2019.01); *G06Q 10/10* (2013.01); *G06Q 50/01* (2013.01); *H04L 67/306* (2013.01)

(58) Field of Classification Search
CPC ........... G06F 16/9535; G06F 16/24575; G06F 16/24578; G06Q 10/10; G06Q 50/01; H04L 67/306
See application file for complete search history.

(56) References Cited

U.S. PATENT DOCUMENTS

| | | | |
|---|---|---|---|
| 7,904,511 B2 * | 3/2011 | Ryan | G06Q 50/01 709/204 |
| 2005/0171954 A1 * | 8/2005 | Hull | H04L 51/32 |
| 2006/0190536 A1 * | 8/2006 | Strong | G06Q 10/10 709/204 |

* cited by examiner

*Primary Examiner* — Azizul Choudhury (57) ABSTRACT

A method and system for recommending potential contacts to a target user is provided. A recommendation system identifies users who are related to the target user through no more than a maximum degree of separation. The recommendation system identifies the users by starting with the contacts of the target user and identifying users who are contacts of the target user's contacts, contacts of those contacts, and so on. The recommendation system then ranks the identified users, who are potential contacts for the target user, based on a likelihood that the target user will want to have a direct relationship with the identified users. The recommendation system then presents to the target user a ranking of the users who have not been filtered out.

20 Claims, 11 Drawing Sheets

FIG. 1

List of Paths 0-1
0-1-2
0-1-2-3
0-1-2-5
0-1-4
0-1-4-2
0-1-4-5
0-1-4-6
0-1-4-7
0-9
0-9-8
0-9-8-4
0-9-8-5
0-9-8-7
0-9-8-10
0-9-10
0-9-10-8
0-9-10-11
0-9-10-12

RECOMMENDING CONTACTS IN A SOCIAL NETWORK

CROSS-REFERENCE TO RELATED APPLICATIONS

The present application is a continuation of U.S. patent application Ser. No. 12/546,630, filed on Aug. 24, 2009, and issued as U.S. Pat. No. 9,626,648, which is a continuation of U.S. patent application Ser. No. 11/468,863, filed on Aug. 31, 2006, and issued as U.S. Pat. No. 7,596,597, which are hereby incorporated by reference in their entirety.

BACKGROUND

A social network consists of individuals and their relationships to other individuals. For example, within a company, the employees and their relationships to other employees, such as being members of the same development team or the same management committee, form a social network. Each of the employees may also have relationships to their family members and other non-family friends. Each relationship within a social network specifies a direct relationship between two individuals, such as being members of the same team. Individuals may also have indirect relationships with other individuals. For example, Tom and Mary may not know each other, but both Tom and Mary have a relationship with Jim. In such a case, Tom and Mary would have an indirect relationship to each other through Jim. The distance (number of relationships) between two individuals within a social network is commonly referred to as their "degree of separation." For example, Tom and Mary would have two degrees of separation. Because social networks can have hundreds or thousands of individuals and direct relationships, social networks can be very complex. It would be a difficult and time-consuming task to identify individuals and all their relationships within a large social network.

Fortunately, the identity of individuals and their relationships with other individuals can be automatically derived from data stored by computer systems. Many individuals use their computer systems to store indications of relationships to other individuals. In particular, many software applications allow a user to explicitly store names of others with whom the user has a relationship. ("User" refers to any individual who has a relationship represented on a computer system.) The names (or some other identifiers such as electronic mail addresses) of the other users are stored in address lists for electronic mail programs, in contact lists for instant messaging programs, in invitation lists for event organizing programs, and so on. In addition, the names of the other users can be derived from data that is not an explicit list. For example, the names of users can be derived from the to, from, and cc fields of electronic mail messages, from meeting entries within a calendar, from letters stored as electronic documents, and so on. Each of these other users has a relationship, referred to as a direct relationship, with the user regardless of the "closeness" of the relationship. For example, a user may have a relationship with a co-worker and a relationship with a worker at another company that was cc'd on the same electronic mail message. In this example, the relationship with the co-worker may be closer than the relationship with the worker at the other company. The users with whom a user has a relationship are referred to generally as "contacts" of that user.

In many situations, a user may need to get in touch with their contacts. For example, a user who is a moving to a new job or moving to a new house may want to notify their contacts of the move. As another example, when a user is considering moving to a new job or needs advice on a particular subject, the user may seek advice from their contacts. The user may also request a contact to seek advice on that user's behalf from the contact's contact. Relying on contacts to propagate a request through a social network can be ineffective and even undesirable in certain situations. For example, as the request propagates from contact to contact, important aspects of the request may be omitted or changed, resulting in any response being ineffective. Also, the request may propagate to a contact even though the original requestor would not want that contact to know about the request. For example, an employee requesting information about job openings at other companies would not want that request to propagate to a user at the requester's current company.

SUMMARY

A method and system for recommending potential contacts to a target user is provided. A recommendation system identifies users who are related to the target user through no more than a maximum degree of separation. The recommendation system identifies the users by starting with the contacts of the target user and identifying users who are contacts of the target user's contacts. The recommendation system continues the process of identifying contacts of contacts until the maximum degree of separation is reached. The recommendation system then ranks the identified users, who are potential contacts for the target user, based on a likelihood that the target user will want to have a direct relationship with the identified users. The recommendation system may base the likelihood on the number of contact paths and the length of the contact paths between the target user and an identified user. The recommendation system may also filter out identified users who do not satisfy a recommendation criterion. The recommendation system then presents to the target user a ranking of the users who have not been filtered out. The target user can then decide whether to add the presented users as one of their contacts.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for recommending potential contacts to a target user is provided. In one embodiment, a recommendation system identifies users who are related to the target user through no more than a maximum degree of separation. The recommendation system identifies the users by starting with the contacts of the target user and identifying users who are contacts of the target user's contacts. The recommendation system continues the process of identifying contacts of contacts until the maximum degree of separation (e.g., three) is reached. The sequence of users from the target user to an identified user is referred to as a "contact path." For example, if the target user is Aaron, one of Aaron's contacts is Bill, and one of Bill's contacts is Carlos, then the sequence of Aaron-Bill-Carlos represents a contact path between Aaron and Carlos. That contact path has a path length of two because Aaron and Carlos are separated by two degrees of separation: Aaron's relationship to Bill and Bill's relationship to Carlos. The maximum degree of separation corresponds to a maximum contact path length between two users for making contact recommendations. The recommendation system then ranks the identified users, who are potential contacts for the target user, based on a likelihood that the target user will want to have a direct relationship with the identified users. The recommendation system may base the likelihood on the number of contact paths and the length of the contact paths between the target user and an identified user. For example, if Aaron has only one contact path to Carlos with a path length of two, but Aaron has three contact paths to Cindy with two path lengths of two and one path length of three, then the recommendation system would rank Cindy higher than Carlos because of the multiple contact paths. The recommendation system may also filter out identified users who do not satisfy a recommendation criterion. One recommendation criterion may be that the identified user should not already be a contact of the target user—there is no need to recommend a user who is already a contact. Another recommendation criterion may be that there should be multiple contact paths between the target contact and the identified user. This criterion helps ensure that only users with strong indirect relationships are recommended to the target user. The recommendation system then presents to the target user a ranking of the users who have not been filtered out. The target user can then decide whether to add presented users as one of their contacts. In this way, the recommendation system can allow a target user to establish a direct relationship with users that are currently only indirectly related.

In one embodiment, the recommendation system ranks the identified users based on the number of contact paths between the target user and the identified users and the lengths of those paths. The recommendation system may generate a path score for each contact path between the target user and an identified user. The path score may be inversely proportional to the length of the contact path. The recommendation system then aggregates the path scores for each contact path into a recommendation score for the identified user. The recommendation system may represent the recommendation score by the following equation:

$$\text{Rank}(Z) = \sum_{p \in (X \to Z)} \frac{1}{|p|}$$

where Rank(Z) represents the recommendation score of identified user Z, p represents the contact path from target user X to identified user Z, and |p| represents the path length of contact path p. The recommendation system may alternatively use various other metrics for generating a path score such as a path score that geometrically or exponentially decreases with path length. The recommendation system may not weight each path score equally when aggregating the path scores. For example, the recommendation system may give full weight to the path scores for the first three contact paths, but may give decreasing weight to path scores for additional contact paths.

In one embodiment, the recommendation system identifies "social paths" within a social path length between a pair of users using the contact paths. To identify social paths between a pair of users, the recommendation system first identifies contact paths from the first user of the pair and contact paths from the second user of the pair. The sum of the maximum contact path length for the first user and the maximum contact path length for the second user equals the social path length. For example, if the social path length is six, then the maximum contact path lengths for the first user and the second user may be three. In such a case, the first user A may have a contact path of A-C, A-B-C, and A-B-C-D, and the second user G may have contact paths of G-F-C, G-F-E, and G-F-E-D. After the contact paths for the first user and the second user are identified, the recommendation system then determines whether any of the end users at the end of a contact path of the first user are in common with the end users of a contact path of the second user. Continuing with the example, user C and user D are end users who are common to contact paths of both the first user and the second user. The recommendation system may then generate the social paths based on the common users. For example, the recommendation system may generate the social paths of A-C-F-G (from A-C and G-F-C), A-B-C-F-G (from A-B-C and G-F-C), and A-B-C-D-E-F-G (from A-B-C-D and G-F-E-D). A social path is different from a contact path because the social path may be considered to be an undirected path, while a contact path may be considered to be a directed path. Thus, although in the social path A-C-F-G there is a directed path from user A to user C and from user G to user C, there might not be a directed path from user A to user G. In general, if C is in B's contact list, but B is not in C's contact list, it can be assumed that C knows B so the social path A-B-C-F-G provides a path through which G may be able to contact A. The generating of social paths between a pair of users using their contact paths significantly avoids non-linearly increasing computational complexity that occurs when searching a social network for increasing degrees of separation.

Figure 1:
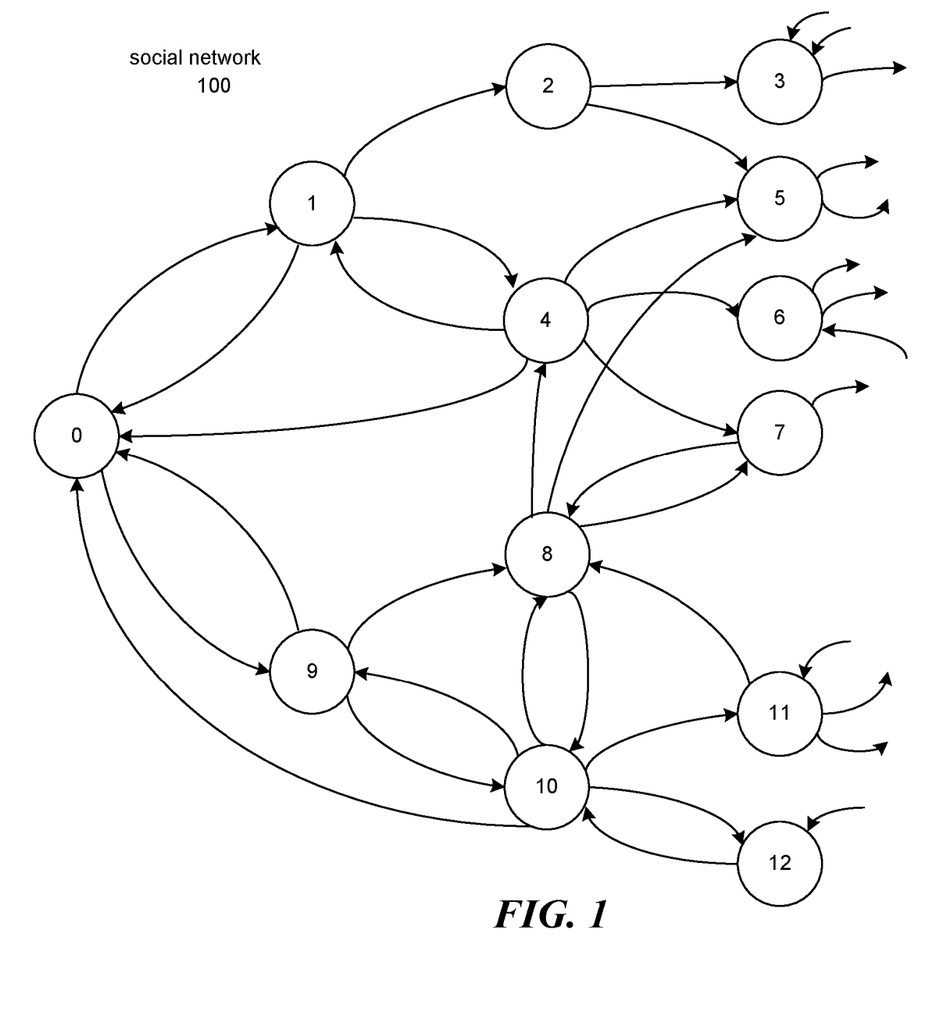
FIG. 1 is a diagram that illustrates an example social network.

FIG. 1 is a diagram that illustrates an example social network. The social network 100 includes nodes 0-12 representing users 0-12 and directed links between the nodes representing direct relationships. For example, because node

Figure 2:
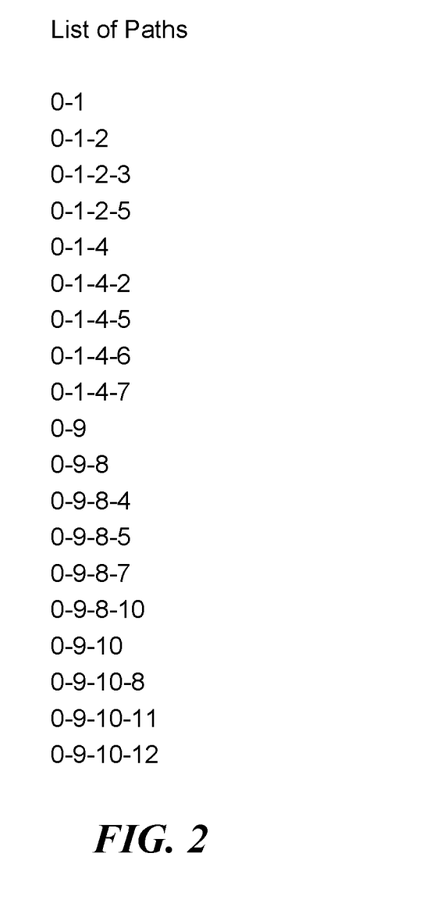
FIG. 2 lists contact paths with a path length of three or less between user 0 and each of the other users.

0 has a directed link to node 1, then user 1 is in the contact list of user 0. A sequence of nodes connected by directed links represents a contact path. For example, the sequence of nodes 0-1-2-5 represents a contact path with a path length of three between user 0 and user 5. The sequence of nodes 0-9-10-8-5 represents a contact path with a path length of four between user 0 and user 5. The sequence of nodes 0-1-2-5 also indicates that contact paths 0-1 and 0-1-2 also exist between user 0 and users 1 and 2. FIG. 2 lists contact paths with a path length of three or less between user 0 and each of the other users. In one embodiment, the recommendation system does not allow the same user to be added twice to a contact path. Alternatively, the presence of a duplicate user may indicate a strong relationship between the target user and the duplicate user, which can be factored in when ranking users.

Figure 3:
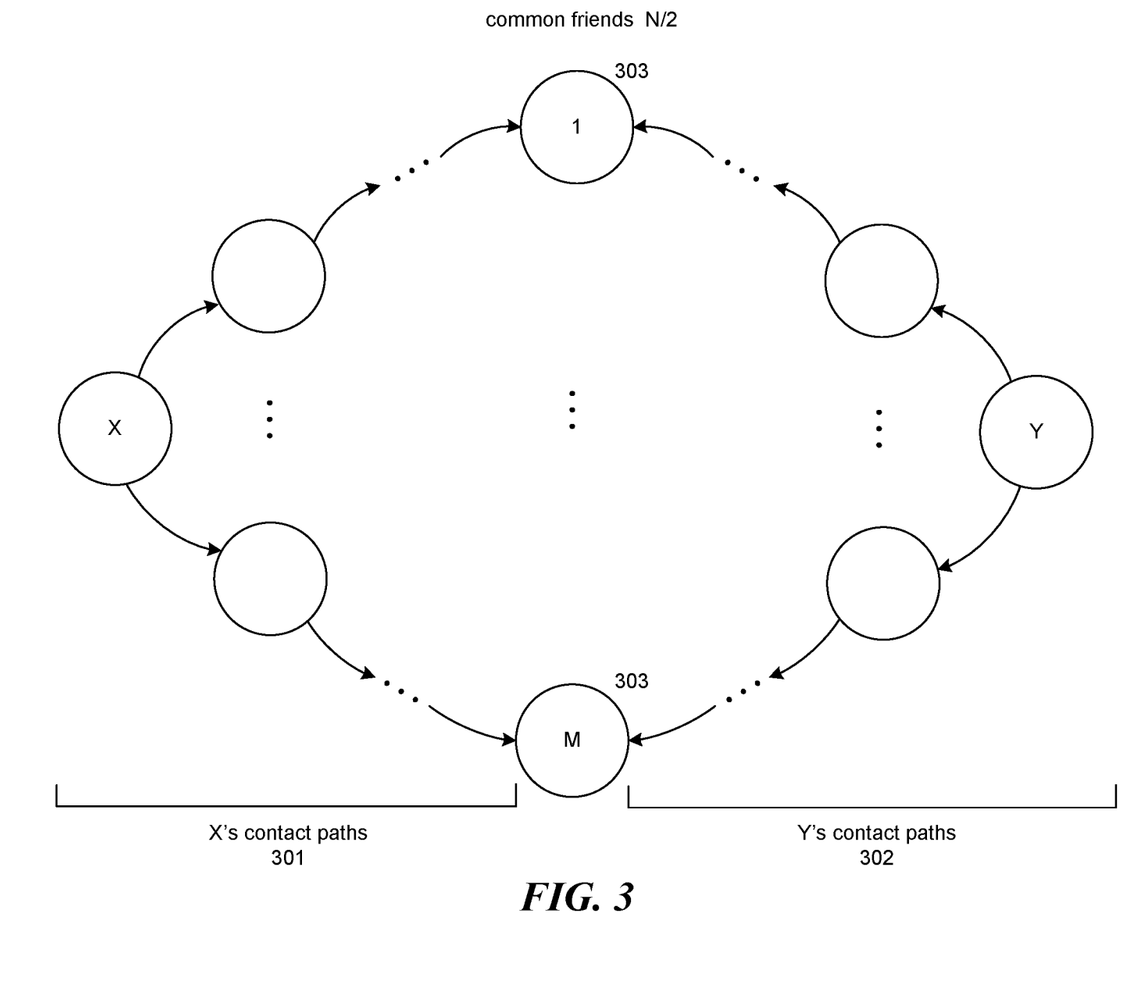
FIG. 3 is a diagram that illustrates social paths between two users in one embodiment.

FIG. 3 is a diagram that illustrates social paths between two users in one embodiment. The two users, user X and user Y, are represented by node X and node Y. The nodes 301 represent the contact paths for user X of a certain maximum contact path length, and the nodes 302 represent the contact paths for user Y of a certain maximum contact path length. The nodes 303 represent the common nodes of the contact paths of user X and user Y. Each path from user X to user Y formed by considering the links to be undirected is a social path.

Figure 4:
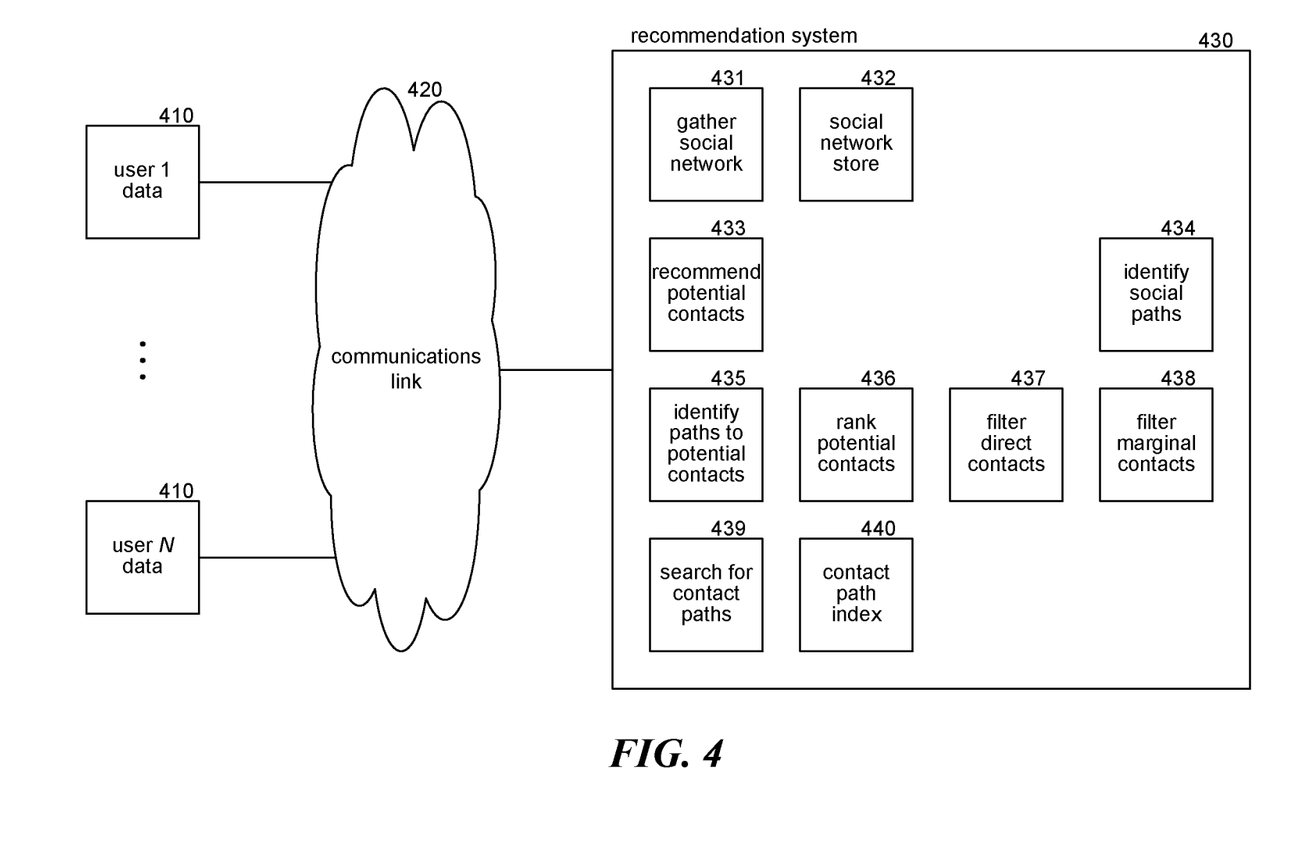
FIG. 4 is a block diagram that illustrates components of the recommendation system in one embodiment.

FIG. 4 is a block diagram that illustrates components of the recommendation system in one embodiment. The recommendation system 430 is connected to the user data stores 410 via communications link 420. The user data stores contain information that includes explicit and implicit contacts of the users. The recommendation system includes a gather social network component 431 and a social network store 432. The gather social network component searches the user data stores for contacts of the users and stores contact lists for each user in the social network store. The recommendation system also includes a recommend potential contacts component 433 and an identify social paths component 434. The recommend potential contacts component invokes an identify paths to potential contacts component 435, a rank potential contacts component 436, a filter direct contacts component 437, and a filter marginal contacts component 438. The identify paths to potential contacts component identifies contact paths from a target user by invoking a search for contact paths component 439. The rank potential contacts component ranks potential contacts based on path length of the contact paths. The filter direct contacts component filters out potential contacts who are direct contacts of the target user. The filter marginal contacts component filters out contacts who only have one contact path from the target user. The search for contact paths component performs the searching for contact paths from a target user. The identify social paths component invokes the search for contact paths component for a pair of users and then identifies the social paths from the contact paths. The recommendation system may also include a contact path index 440 that maps end users of contact paths to their contact paths. The index facilitates the identifying social paths from pairs of contact paths.

The computing devices on which the recommendation system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the recommendation system. In addition, the data structures, message structures, and instructions may be stored or transmitted via a data transmission medium, such as a signal on a communications link. Various communications links may be used, such as the Internet, a local area network, a wide area network, or a point-to-point dial-up connection.

The recommendation system may be implemented in and used by various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The recommendation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the recommend potential contacts component and the identify social paths component may be used independently of each other.

Figure 5:
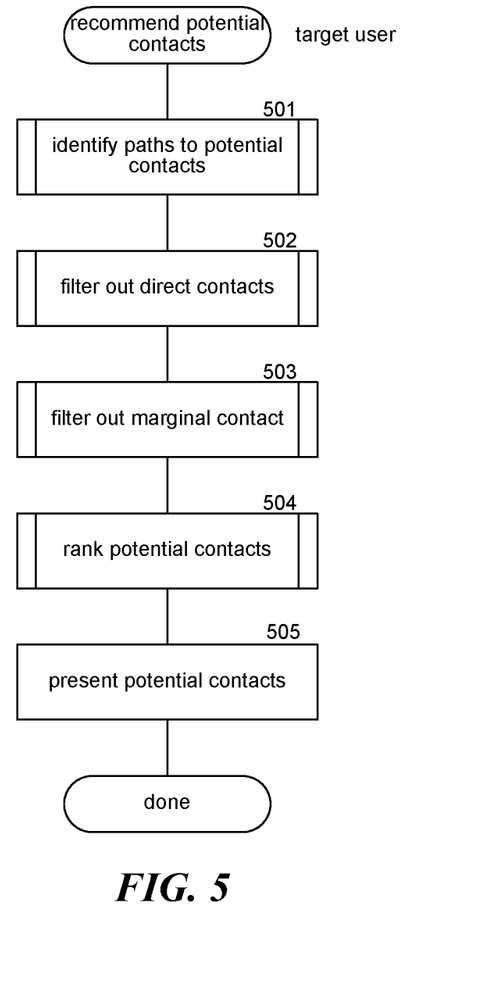
FIG. 5 is a flow diagram that illustrates the processing of the recommend potential contacts component of the recommendation system in one embodiment.

FIG. 5 is a flow diagram that illustrates the processing of the recommend potential contacts component of the recommendation system in one embodiment. The component is passed a target user and identifies and presents to the target user potential contacts that have been ranked. In block 501, the component invokes the identify paths to potential contacts component to identify contact paths from the target user to potential contacts with a contact path length less than or equal to a maximum contact path length. In block 502, the component invokes the filter direct contacts component to remove direct contacts of the target user from the potential contacts. In block 503, the component invokes the filter marginal contacts component to remove potential contacts with only one contact path from the target user. In block 504, the component invokes the rank potential contacts component to rank the potential contacts identified in the contact paths. In block 505, the component presents the potential contacts as ranked to the target user and then completes. In certain implementations, the potential contacts may be used in ways other than presenting to the target user. For example, the knowledge of potential contacts of a target user may be important to third parties such law enforcement officials, philanthropic organizations, and so on.

Figure 6:
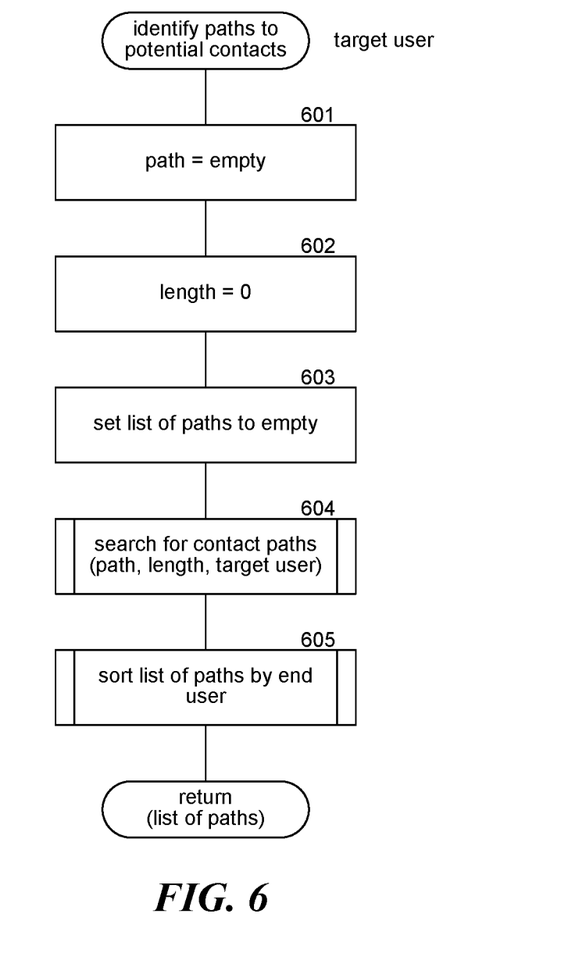
FIG. 6 is a flow diagram that illustrates the processing of the identify paths to potential contacts component of the recommendation system in one embodiment.

FIG. 6 is a flow diagram that illustrates the processing of the identify paths to potential contacts component of the recommendation system in one embodiment. The component is passed a target user and then invokes the search for contact paths component. The search for contact paths component is a recursive component that is passed the current path from a target user, the length of the current path, and a user to add to the path. In block 601, the component initializes the path to empty. In block 602, the component sets the initial length of the path to zero. In block 603, the component sets a list of paths to empty. In block 604, the component invokes the search for contact paths component to identify the contact paths from the target user. In block 605, the component sorts the list of paths by the end user of the paths to facilitate processing of the paths based on the end users. The component may also generate an index of end user to contact path. The contact paths are stored in the list of paths.

Figure 7:
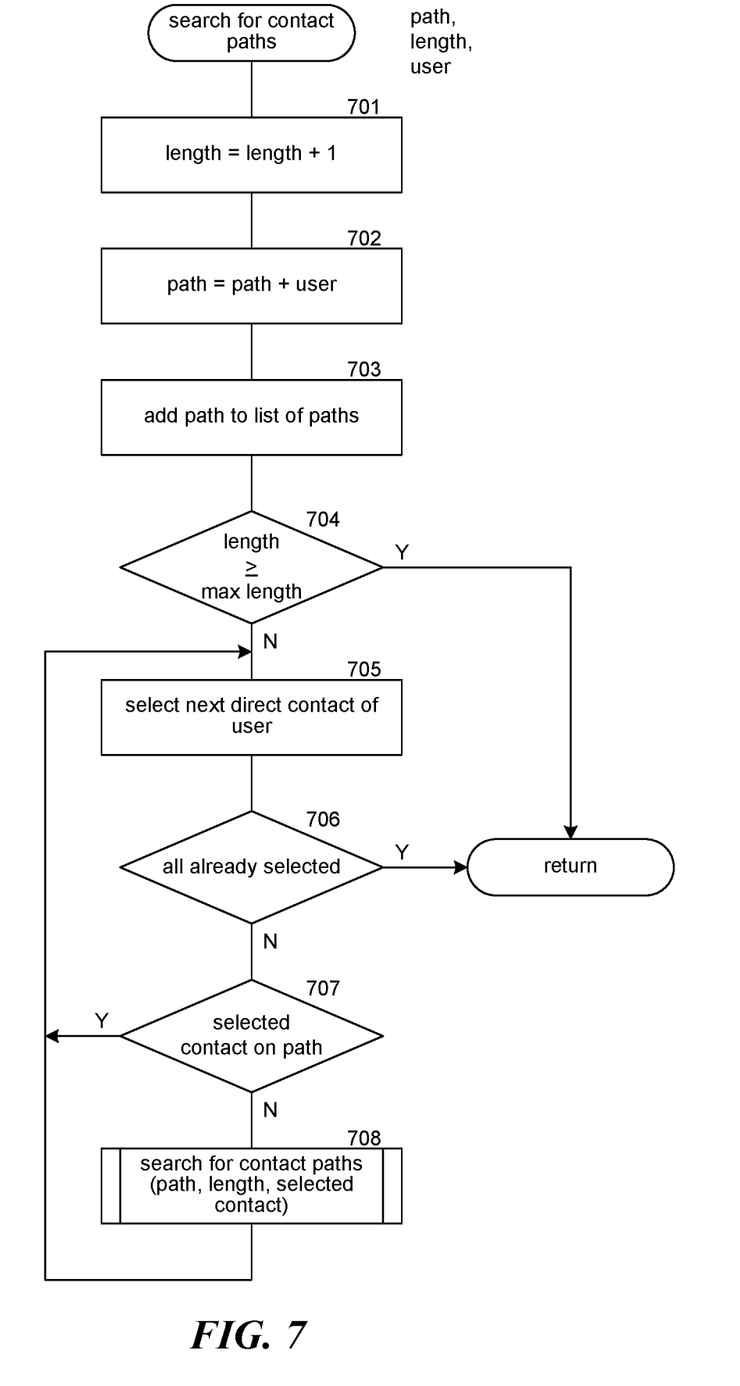
FIG. 7 is a flow diagram that illustrates the processing of the search for contact paths component of the recommendation system in one embodiment.

FIG. 7 is a flow diagram that illustrates the processing of the search for contact paths component of the recommendation system in one embodiment. The component is passed a path, a length of the path, and a user. The component adds the user to the path and recursively invokes the component for each direct contact of the passed user to extend the path up to the maximum contact path length. In block 701, the component increments the path length. In block 702, the component adds the passed user to the path. In block 703, the component adds the path to the list of paths. In decision block 704, if the path length is greater than or equal to the maximum contact path length, then the component returns, else the component continues at block 705. In blocks 705-708, the component recursively invokes itself for each direct contact of the passed user. In block 705, the component selects the next direct contact of the passed user. In decision block 706, if all the direct contacts of the passed user have already been selected, then the component returns, else the component continues at block 707. In decision block 707, if the selected contact is already on the path, then the component loops to block 705 to select the next direct contact of the passed user, else the component continues at block 708. In block 708, the component recursively invokes the search for contact paths component passing the path, the path length, and the selected contact. The component then loops to block 705 to select the next direct contact of the passed user.

Figure 8:
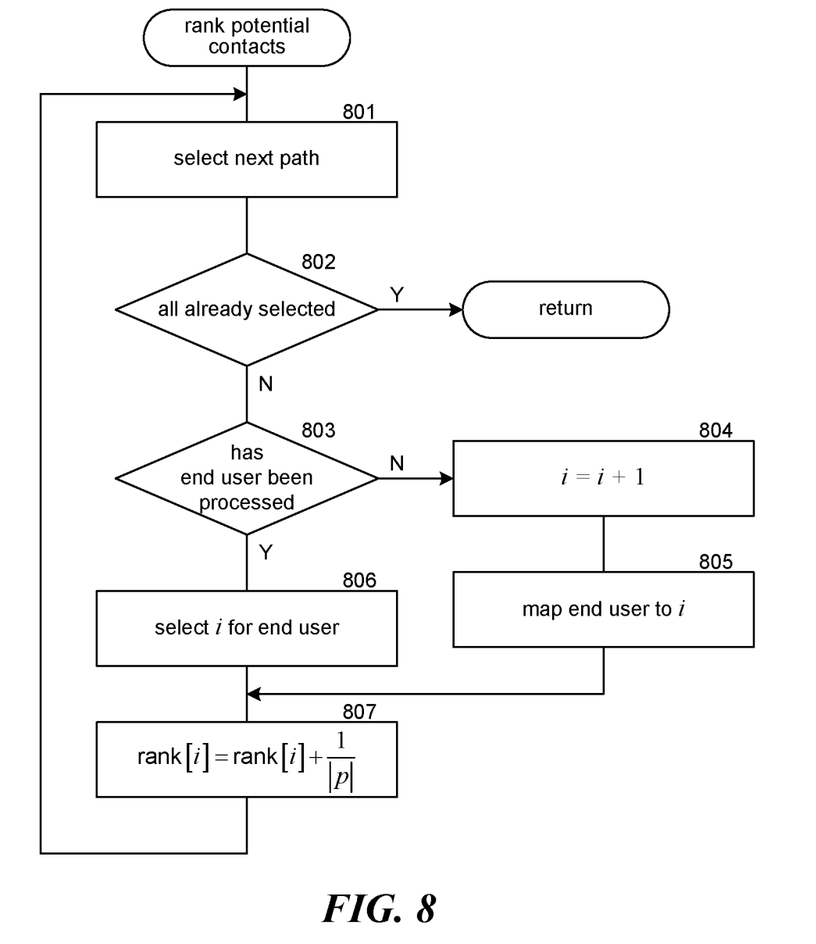
FIG. 8 is a flow diagram that illustrates the processing of the rank potential contacts component of the recommendation system in one embodiment.

FIG. 8 is a flow diagram that illustrates the processing of the rank potential contacts component of the recommendation system in one embodiment. The component generates a recommendation score for each user identified as a potential contact by aggregating the path scores for the user. The component initializes the recommendation score to 0 for each user. In blocks 801-807, the component loops selecting each contact path and aggregating a path score for the selected contact path into recommendation scores for the identified users. In block 801, the component selects the next contact path. In decision block 802, if all the contact paths have already been selected, then the component returns, else the component continues at block 803. In decision block 803, if the end user of the contact path has already been processed by this component, then the component continues at block 806, else the component continues at block 804. In block 804, the component increments an index of potential contacts. The index identifies the end user. In block 805, the component maps the end user to the index so that the same index can be used for that end user and continues at block 807. In block 806, the component selects the index for the end user of the selected contact path. In block 807, the component aggregates the path score for the selected contact path into the recommendation score for the end user of the selected contact path. The component then loops to block 801 to select the next contact path.

Figure 9:
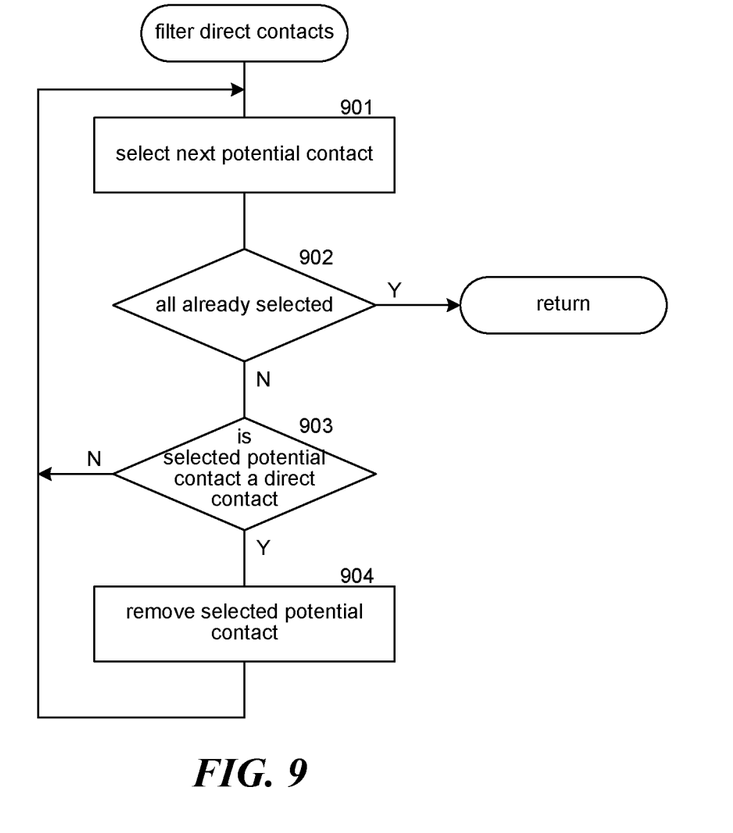
FIG. 9 is a flow diagram that illustrates the processing of the filter direct contacts component of the recommendation system in one embodiment.

FIG. 9 is a flow diagram that illustrates the processing of the filter direct contacts component of the recommendation system in one embodiment. The component removes potential contacts who are already direct contacts of the target user. In block 901, the component selects the next potential contact. In decision block 902, if all the potential contacts have already been selected, then the component returns, else the component continues at block 903. In decision block 903, if the selected potential contact is a direct contact of the target user, then the component continues at block 904, else the component loops to block 901 to select the next potential contact. In block 904, the component removes the selected potential contact from the list of potential contacts and then loops to block 901 to select the next potential contact.

Figure 10:
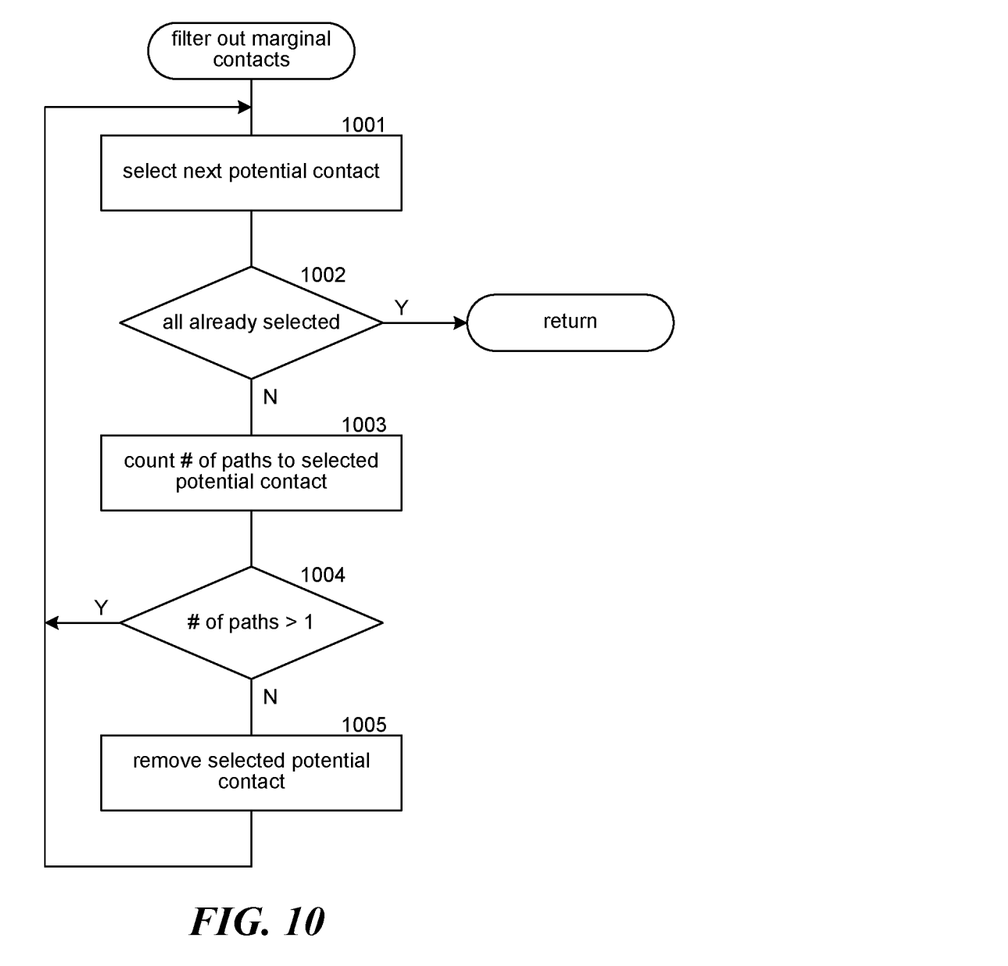
FIG. 10 is a flow diagram that illustrates the processing of the filter marginal contacts component of the recommendation system in one embodiment.

FIG. 10 is a flow diagram that illustrates the processing of the filter marginal contacts component of the recommendation system in one embodiment. The component removes potential contacts who do not satisfy the marginal contact criterion. In block 1001, the component selects the next potential contact. In decision block 1002, if all the potential contacts have already been selected, then the component returns, else the component continues at block 1003. In block 1003, the component counts the number of contact paths to the selected potential contact. In decision block 1004, if paths to the selected potential contact satisfies a marginal contact threshold (e.g., the number of contact paths is greater than one), then the selected potential contact satisfies the marginal contact criterion and the component loops to block 1001 to select the next potential contact, else the component continues at block 1005. In block 1005, the component removes the selected potential contact from the list of potential contacts and then loops to block 1001 to select the next potential contact. One skilled in the art will appreciate that many different marginal contact thresholds can be used. For example, the threshold may be that a contact is not marginal if there is at least one path of length two or two paths of length three.

Figure 11:
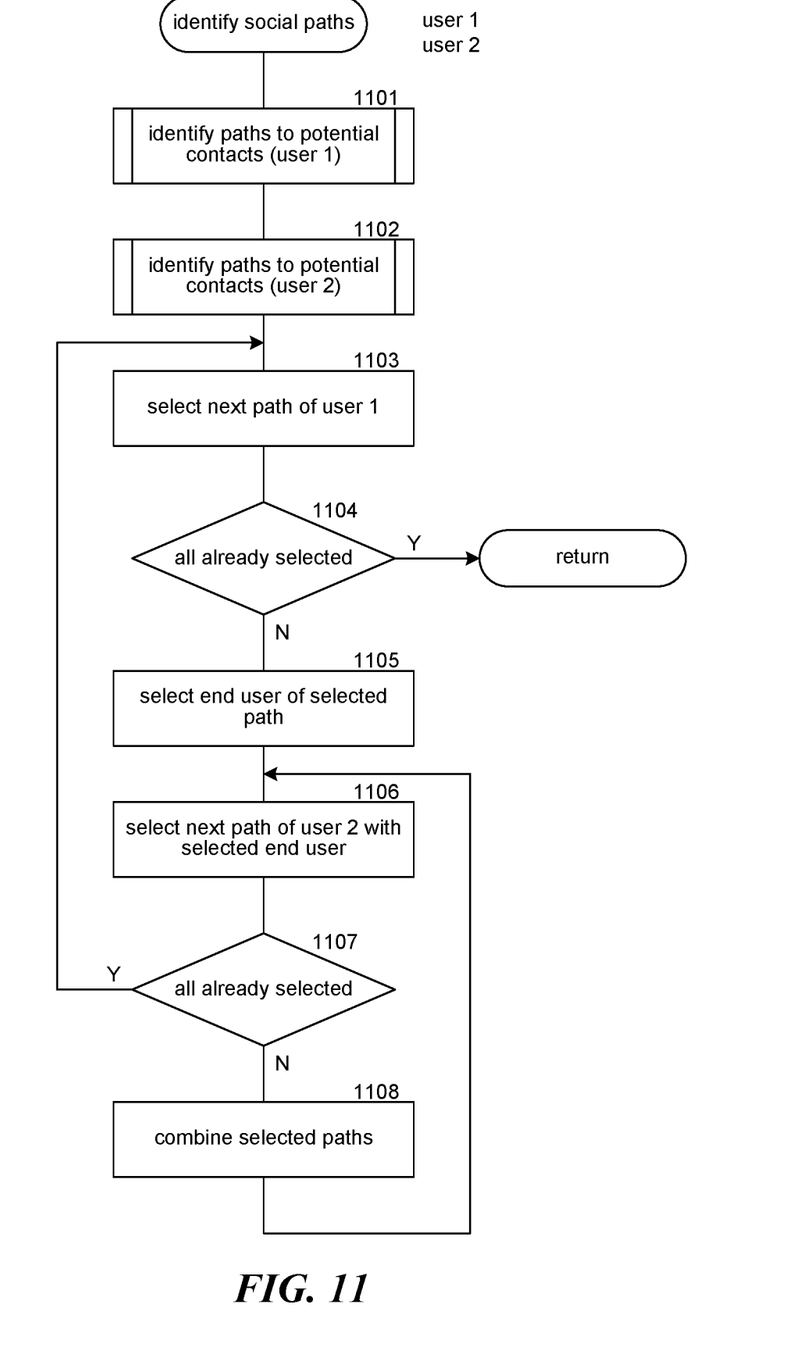
FIG. 11 is a flow diagram that illustrates the processing of the identify social paths component of the recommendation system in one embodiment.

FIG. 11 is a flow diagram that illustrates the processing of the identify social paths component of the recommendation system in one embodiment. The component is passed a pair of users and identifies the social paths between the users based on contact paths from each of the users. The component may generate a user index for the contact paths of the first user and a user index for the contact paths of the second user to facilitate the locating of common users. In block 1101, the component invokes the identify paths to potential contacts component to identify the contact paths from the first user. In block 1102, the component invokes the identify paths to potential contacts component to identify the contact paths from the second user. In blocks 1103-1108, the component loops identifying social paths between the first user and the second user based on common potential contacts as indicated by the identified paths. In block 1103, the component selects the next contact path of the first user. In decision block 1104, if all the potential contacts of the first user have already been selected, then the component returns, else the component continues at block 1105. In block 1105, the component selects the end user of the selected contact path. In block 1106, the component selects the next contact path from the second user with the same selected end user. In decision block 1107, if all such contact paths have already been selected, then the component loops to block 1103 to select the next contact path from the first user, else the component continues at block 1108. In block 1108, the component combines the selected contact paths into a social path between the first user and the second user and then loops to block 1106 to select the next contact path of the second user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computer-readable memory containing instructions for controlling a computing system to identify potential contacts for a target user, the instructions comprising instructions that, when executed, control the computing system to:

access a plurality of contact lists of users, each contact list
identifying contacts of a user;
identify, from a contact list of the target user, contact paths
from the target user to candidate users that are within
a maximum contact path length, a contact path being a
directed path of contacts such that each contact in the
directed path is in the contact list of the prior contact in
the directed path;
filter the identified contact paths to remove contact paths
that do not satisfy a set of recommendation criteria for
a contact path, the set of recommendation criteria
comprising:
a first recommendation criterion that a candidate user of
the contact path is not in the contact list of the target
user; and
a second recommendation criterion that there are multiple contact paths between the target user and the
candidate user; and
generate, based on the filtered contact paths, a list of
candidate users, the list ranked according to contact
path length.

2. The computer-readable memory of claim 1, wherein the instructions further comprise instructions that, when executed, control the computing system to present, to the target user, the ranked list as an identification of potential contacts for the target user.

3. The computer-readable memory of claim 1, wherein the instructions that rank the list of candidate users further comprise generating a recommendation score for each candidate user by aggregating a path score for each contact path between the target user to the candidate user, and wherein the candidate users are ranked based on the recommendation scores.

4. The computer-readable memory of claim 1, wherein the path score for a contact path decreases as the path length of the contact path increases.

5. A method performed by a computing device for recommending potential contacts for a target user based on analysis of contact lists of a plurality of users, the method comprising:
accessing a data store containing contact lists of the
plurality of users, the contact lists including a contact
list for the target user;
identifying, from the contact lists, a set of social paths
from the target user to candidate users, wherein each
social path comprises a first contact path from the target
user to a common user and a second contact path from
a candidate user to the common user, such that each
user on the first contact path and the second contact
path are on the social path and such that the social path
is identified between the target user and the candidate
user even without a contact path from the target user to
the candidate user;
filtering the identified set of social paths to remove social
paths that do not satisfy a set of recommendation
criteria for the social path, the set of recommendation
criteria comprising:
a first recommendation criterion that a candidate user of
the social path is not in the contact list of the target
user; and
a second recommendation criterion that there are multiple social paths between the target user and the
candidate user; and
ranking the candidate users of the filtered set of social
paths based on path lengths of the social paths.

6. The method of claim 5, further comprising presenting to the target user an indication of the ranking of the unfiltered users as recommendations for potential contacts that the target user may want to add to the contact list of the target user such that users already in the contact list of the target user are not recommended as potential contacts for the contact list of the target user.

7. The method of claim 5, wherein identifying the set of social paths includes traversing a social network formed by the contact lists starting at the contact list of the target user and a social network formed by the contact lists starting at the candidate users.

8. The method of claim 5, wherein the ranking of the candidate users includes generating a recommendation score for a candidate user by aggregating a path score for each social path between the target user to the candidate user.

9. The method of claim 5, wherein contact paths from the target user to the candidate users do not exist in the contact lists.

10. The method of claim 5, wherein a contact path from a first user to a second user is a directed path of contacts identified from the contact lists.

11. A method performed by a computing device for recommending potential contacts for a first user, the method comprising:
accessing a data store containing contact lists of users that
include the first user and a second user;
identifying from the contact lists, contact paths from the
first user to other users and contact paths from the
second user to other users;
when there is a contact path from the first user to a third
user and a contact path from the second user to the third
user but no contact path from the first user to the second
user, indicating that a social path exists between the
first user to the second user, the social path having a
length; and
identifying the second user as a potential contact for the
first user based at least in part on the existence of the
social path and a recommendation criterion that there
are multiple social paths between the first user and the
second user, the length of the social path not being the
criterion.

12. The method of claim 11, wherein the indicating that a social path exists includes indexing the contact paths of the first user and the second user to facilitate identifying users common to the contact paths of the first user and the second user.

13. The method of claim 11, wherein identifying the set of contact paths for a user includes traversing a social network formed by the contact lists starting at the contact list of the user.

14. The method of claim 11, wherein identifying the set of contact paths includes identifying contact paths of a maximum length.

15. The method of claim 11, wherein indicating that a social path exists includes identifying all social paths between the first user and the second user that are through the third user.

16. The method of claim 11, further comprising recommending the second user to the first user as a potential contact.

17. A method for identifying a potential contact for a target user, comprising:
identifying a first user that is a contact of the target user;
generating, based on a contact list of the first user, a first
contact path from the target user to a second user,
wherein the second user is not a contact of the target
user, and wherein the contact path comprises:
the target user;

the first user; and the second user;

determining whether there is a second contact path from a third user to the second user, wherein the third user is a contact of the target user; and based on determining that there is a second contact path to the second user in addition to the first contact path to the second user, generating a potential contact recommendation comprising the second user.

18. The method of claim 17, wherein the first contact path is generated based on the second user being in the contact list of the first user.

19. The method of claim 17, wherein the contact path further comprises a fourth user between the first user and the second user, and wherein:

the fourth user is a contact of the first user; and the second user is a contact of the fourth user.

20. The method of claim 17, further comprising providing the generated potential contact recommendation for display to the target user.

\* \* \* \* \*